Jan. 3, 1928.

J. H. COPE 1,654,722

SWEEP RAKE

Filed June 6, 1924

Inventor
Joseph H. Cope.
By A. J. O'Brian
Attorney

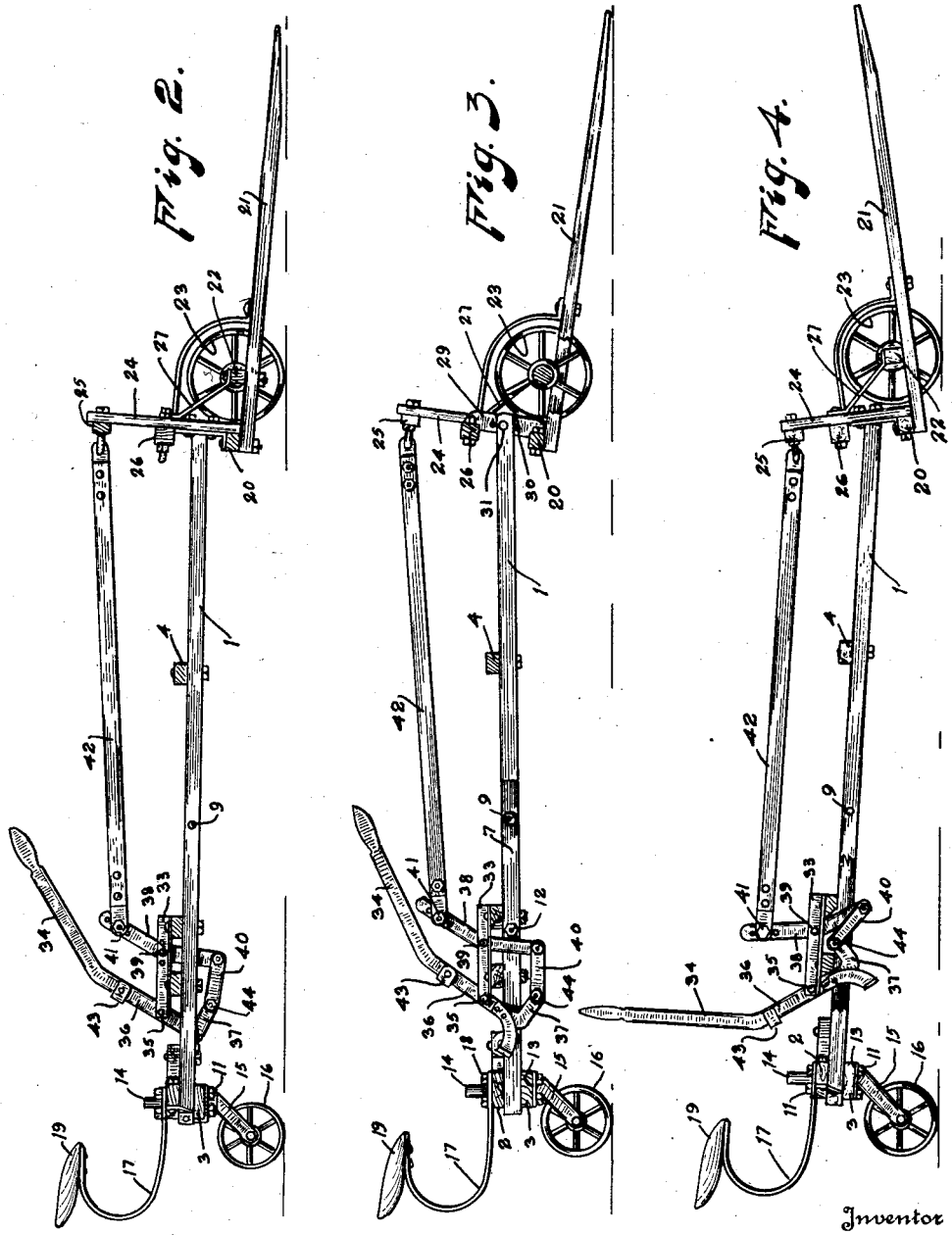

Jan. 3, 1928.

J. H. COPE 1,654,722

SWEEP RAKE

Filed June 6, 1924 3 Sheets-Sheet 3

Inventor
Joseph H. Cope.

By A. J. O'Brien

Attorney

Patented Jan. 3, 1928.

1,654,722

UNITED STATES PATENT OFFICE.

JOSEPH H. COPE, OF DENVER, COLORADO.

SWEEP RAKE.

Application filed June 6, 1924. Serial No. 718,286.

This invention relates to improvements in sweeprakes of the type described and claimed in United States Letters Patent No. 1,205,-973 granted to me on the twenty-eighth day of November, 1916.

In this type of rake the head of the rake is in front of the horses, which are so hitched to the same that they push the rakehead against the material to be collected. After a load of hay has been gathered, the rakehead is tilted so that the entire weight of the load will be carried on the wheels that are attached to the head. With the rakehead in the elevated position, the load can be transported to the stack or the location where the unloading is to be done.

In rakes of this type it is essential that the points of the rake teeth shall be brought into close proximity to the ground during the hay gathering operation and that they shall be able to rise and fall to conform to the unevenness of the surface of the ground.

It is also necessary to provide means whereby the operator can readily raise the rakehead and the load when the latter is being transported and to lock the parts in raised position.

Rakes of this type are also provided at their rear ends with casters that are mounted for rotation about vertical axes. As these rakes are subject to rough usage, and to severe strains, it is essential that the framework shall be very rigid and well braced.

It is the object of this invention to produce a rake that shall be so constructed that it will embody all of the qualities referred to above and others which will be come apparent as the description proceeds.

My invention can be most clearly described and will be most readily understood when reference is had to the accompanying drawing in which the preferred embodiment thereof is shown, and in which:

Fig. 2 is a side elevation of the same;

Fig. 3 is a section taken on line 3—3, Fig. 1, and shows the parts in the position that they occupy when the rake is gathering hay;

Fig. 4 is a side elevation similar to that shown in Fig. 2, but with parts broken away to show the position of the levers when the rakehead is raised for transporting the hay.

Figure 1:
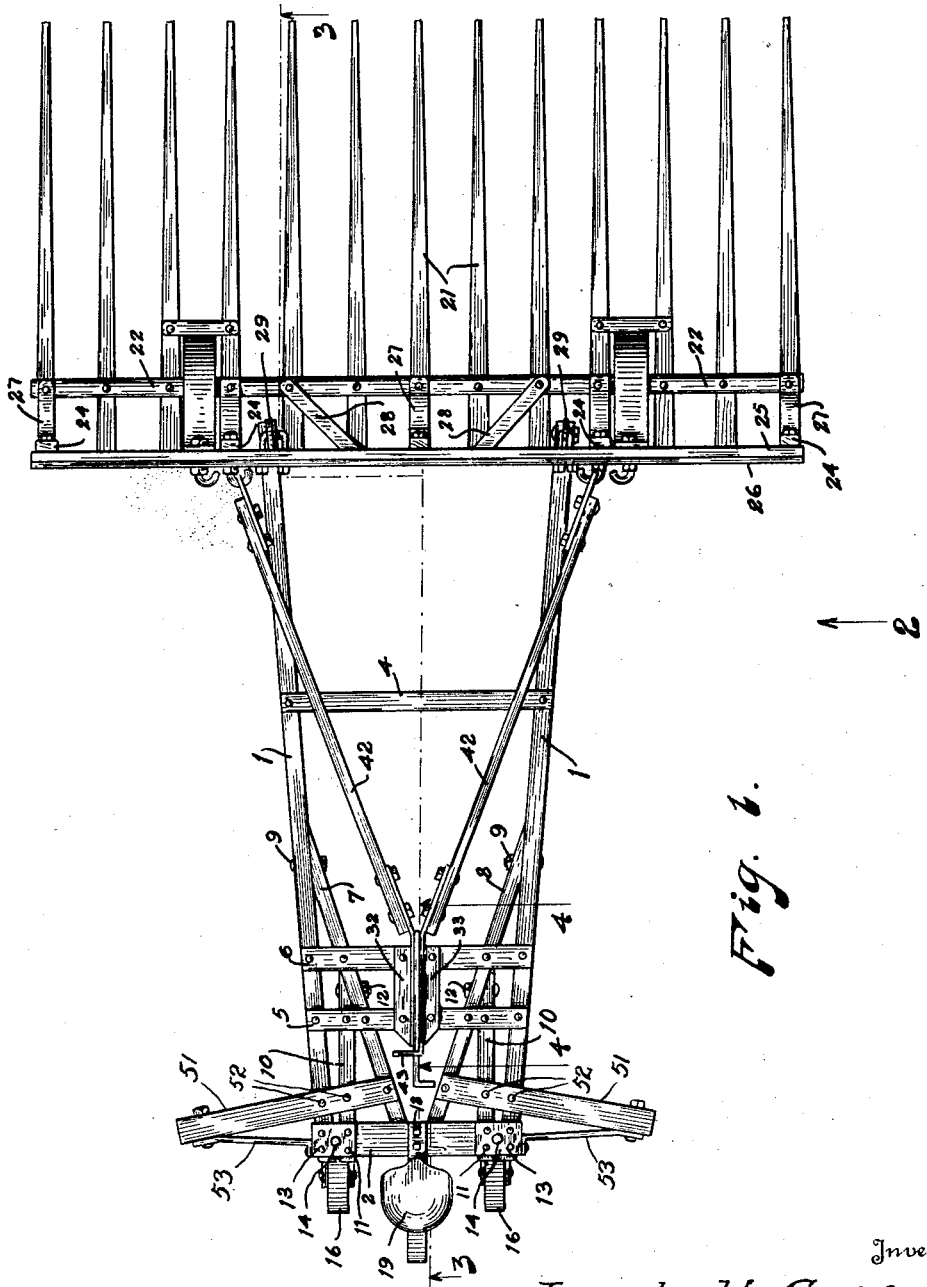
Fig. 1 is a top plan view of my improved rake.

My improved rake comprises a frame having side members 1 connected at their rear ends by transverse members 2 and 3 and connected at a point intermediate their ends by means of a transverse bar 4. The bar 4 is longer than the members 2 and 3 whereby the side members become inclined with respect to each other. The side members 1 are also connected by means of transverse bars 5 and 6. Diagonal brace members 7 and 8 extend from a point substantially midway between the rear ends of the transverse members 2 and 3 to the inside of members 1, to which they are connected by means of bolts 9. Short braces 10 have their rear ends secured to members 2 and 3 by bolts 11 and their front ends secured to the diagonal braces by means of bolts 12. The braces 10 are substantially parallel with each other and they have their rear ends spaced a short distance from the inside of side members 1. Steel plates 13 are clamped to the upper side of transverse member 2 and the lower side of transverse member 3 by bolts 11. Each plate has a central opening for the reception of the vertical shaft 14 which extends from the fork 15 to the ends of which the wheel 16 is secured. It will be noted that the fork 15 extends at an angle to the axis of the shaft 14 and that the pivot of wheel 16 is to one side of the axis. The wheels 16 therefore operate like ordinary furniture casters. A spring 17 is secured to the members 2 and 3 by bolts 18 and carries the seat 19.

Attention is called at this place to the bracing effect of the members 2 and 3. Heretofore, it has been customary to use only one transverse member, such as the one numbered 2. This puts a great strain on the bolts and after a comparatively short time the parts get loose. By the simple expedient of using a second transverse bar 3, a rigid construction is secured that results in a stronger and more substantial frame.

The rakehead consists of a bar 20 to which the rear ends of the rake teeth 21 are attached. A short distance in front of the bar 20 an axle 22 is fastened to the teeth. Two wheels 23 are rotatably mounted on the axle. Secured to the bar 20 are short vertical members 24 to which the bars 25 and 26 are attached. Braces 27 extend from the upper side of the axle 22 to the end bars 24, while short braces 28 extend diagonally from the axle 22 to the bar 20. Vertical metal bars 29 (Fig. 3) extend between and are secured to bars 20 and 26. These bars have a plurality of holes 30 to which the front ends of the side members 1 are secured by means of pins 31. Secured to the transverse members 5 and 6 are two parallel angles 32 and 33. A handle 34 is secured between the rear ends of these angles by a bolt 35, about which it pivots. This handle has a straight central portion 36 whose lower end is bent at right angles thereto, as indicated by numeral 37. The upper part of the handle is also angularly inclined with respect to the part 36. A lever 38 is pivoted intermediate its ends to the angles 32 and 33, and is adapted to rotate about the point 39. This lever is bent, as shown in Figs. 2, 3 and 4. A link 40 connects the end of the part 37 with the lever 38. It is now evident that the lever 38 can be rotated about its pivots by means of the handle 34. Pivoted at 41 to the upper end of lever 38 are bars 42 whose front ends are pivotally attached to the upper ends of the vertical bars 24 in the manner shown. It is now apparent that when the lever 38 is moved about its pivot, the rake head will be tilted with respect to the plane of the side members 1. The handle 34 is provided with a foot rest 43, which permits the operator to apply to the lever a force which tends to move it toward the position shown in Fig. 3 in which position it will be noted that the rake rests on the wheels 16 and the tips of the rake teeth. This is the limiting position and is rarely attained, the usual position when gathering the hay being that shown in Fig. 2.

When the rakehead is full of hay, the lever 34 is moved rearwardly to the position shown in Fig. 4. This tilts the rakehead so that the teeth incline upwardly. It will be noticed from Fig. 4 that link 40, which is pivoted to part 37 at point 44, forms with its associated parts an overset toggle, which holds the rakehead in inoperative position while the load is being transported to the stack.

It is evident that the shorter the distance is between the pivot 31 and the front end of the bar 42, the greater will be the tilting of the rakehead for a given movement of the lever 38. I have therefrom provided the bar 29 with a plurality of openings 30 so that adjustments may be made if desired. It is also evident that by moving the pivot 31 upwardly on the bars 29, the force tending to keep the rake teeth down against the surface of the ground will be increased.

For the purpose of providing a convenient place to which the horses may be hitched, I have provided two outboard members 51, one on each side of the frame. These members are fastened to members 1, 10 and 7 and 1, 10 and 8 by means of bolts 52. Braces 53 extend from the outer ends of the members 51 to the sides of the frame, all as shown in Fig. 1.

Figure 5:
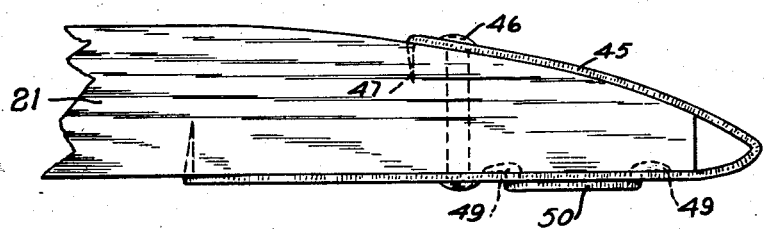
Fig. 5 is a side elevation showing my improved tooth point in place on the tooth.
Figure 6:
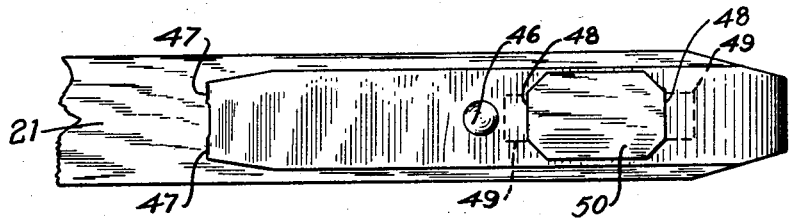
Fig. 6 is a bottom plan view of the parts shown in Fig. 5.

Since the rake teeth points are always held in contact with the ground when the load is being gathered, it is evident that they will wear away very rapidly. It has therefore been found desirable to provide them with steel points, such as I have shown in Figs. 5 and 6. A steel strap 45 is bent into a shape resembling a capital U or a V. This bent strap is secured to the point of the tooth by means of a rivet 46. The ends of the strap have teeth 47 that project into the wood to prevent the strap from being rotated about the pivot 46. It has been found that these metal straps wear away very fast on the lower side. I have therefore provided the lower member with two spaced transverse slots 48 through which the ends 49 extend. These ends 49 are integral with the central plate 50. When plate 50 gets badly worn, it is removed by means of a screw driver or a chisel, which may be inserted between the plate and the strap 45. After the worn out plate has been removed, a new plate may be put into place by being slightly bent and then driven home by a hammer.

From the above description, it will be apparent that I have produced a substantial sweep-rake, which is framed in such a way that the severe strains to which it is subjected by the action of the casters 16 will be successfully resisted. It is also provided with a link and lever mechanism that is simpler than any which have heretofore been employed, and which accomplishes its function in a more satisfactory manner than similar mechanisms known to me. My rake is also so constructed that the rate at which the rakehead can be tilted by means of the lever 38 can be altered whenever necessary.

Having now described my invention what I claim as new is:

1. A sweep-rake frame having two side members inclined equally with respect to an axis of symmetry, the ends of said side members that are nearest to each other being connected by two transverse bars one being located above and the other below said side members, diagonal brace members extending from points near the center of said transverse bars to a point on the inside of said side members intermediate their ends, and bars extending from the transverse bars to a point on the diagonal braces, said last-named bars being substantially parallel to the axis of symmetry and spaced substantially equidistantly therefrom.

2. In a rake having a frame whose rear end is supported on caster wheels, a rake head supported on a pair of wheels and pivotally connected with the front end of said frame, means for tilting the rake head with respect to the frame, said tilting means comprising a lever pivoted intermediate its ends to said frame, one end projecting above the frame and the other end projecting below the frame, a rigid member connecting the upper end of the lever with the vertical framework of the rake head, a handle pivoted intermediate its ends, the lower end of the handle projecting below the frame and being bent forwardly approximately 90 degrees, and a link connecting the bent end of the handle with the lower end of the lever, the point of connection between the link and the handle being adapted to cross a line connecting the point where the handle is pivoted to the frame with the point where the link is connected to the lever whereby a locking toggle action is secured in one position of the handle.

In testimony whereof I affix my signature.

JOSEPH H. COPE.